UNITED STATES PATENT OFFICE.

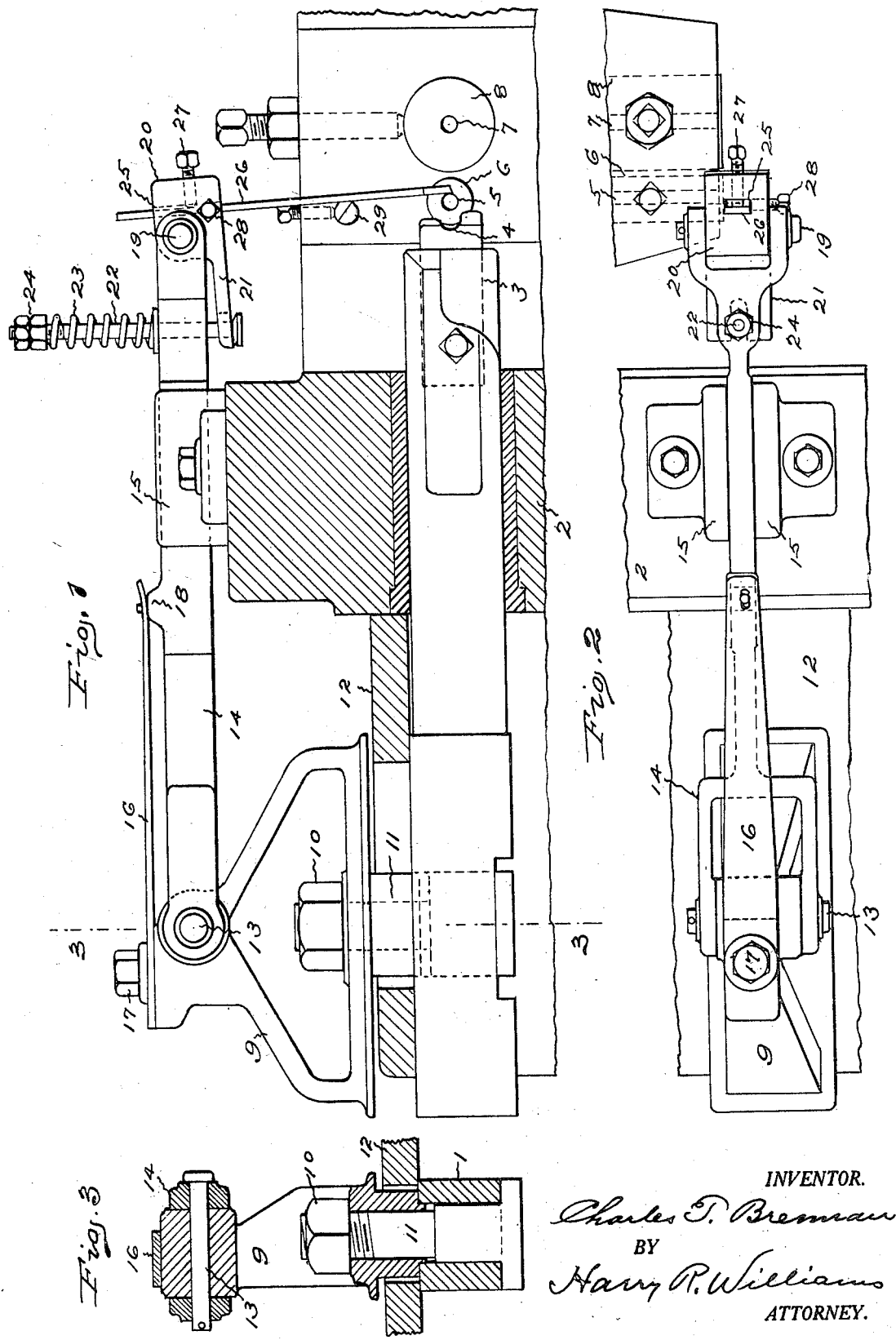

CHARLES T. BRENNAN, OF WATERBURY, CONNECTICUT, ASSIGNOR TO THE E. J. MANVILLE MACHINE COMPANY, OF WATERBURY, CONNECTICUT, A STATUTE CORPORATION OF CONNECTICUT.

STOCK CUTTING AND TRANSFERRING MECHANISM FOR HEADING-MACHINES.

1,299,115.  Specification of Letters Patent.  Patented Apr. 1, 1919.

Application filed October 7, 1918. Serial No. 257,151.

*To all whom it may concern:*

Be it known that I, CHARLES T. BRENNAN, a citizen of the United States, residing at Waterbury, in the county of New Haven and State of Connecticut, have invented a new and useful Improvement in Stock Cutting and Transferring Mechanism for Heading-Machines, of which the following is a specification.

In the class of solid-die machines for forming heads on rivets, headed pins, bolt-blanks, screw-blanks and the like headed pieces, the wire or rod of stock is fed in through an opening in the cut-off die past a cutting blade and against a stop. Then the cutter is moved over and severs the required amount of stock to form the headed article and carry the cut piece into line with the opening in the heading die and hold it until the heading punch pushes a portion into the die, after which, but before it is fouled by the heading punch, the cutter is withdrawn and returned to its former position. This invention relates to the means used with this class of machines for holding the severed piece of stock to the cutter while the piece is being transferred to the heading die, and which releases its hold on the stock so that the cutter may be withdrawn out of the path of the heading die.

The object of this invention is to provide means for this purpose which is simple in construction and operation, readily adjustable for various sizes of stock, and durable and sure under long continued rapid and violent action.

Figure 1 of the accompanying drawings shows an elevation of a stock-cutting and transferring means which embodies this invention and so much of a solid-die heading-machine of common type as is necessary to illustrate the position and action of the device. Fig. 2 shows a plan of the mechanism and a few of the parts of the machine. Fig. 3 shows a vertical section on the plane indicated by the dotted line 3—3 on Fig. 1.

As this type of heading machine is well known and in common use, only the portions in immediate connection with and which coact with the elements of this invention are illustrated and described herein.

In the view 1 indicates the cutter-bar which is reciprocated transversely of the frame 2 of the machine by the usual mechanism, and which at its inner end carries the cutter 3 that has the ordinary curved cutting edge 4. The wire or rod of stock is fed through the opening 5 in the cutting die 6 and when the cutter-bar is moved inward the cutter moving across the face of the cutting die severs the required length of stock and carries it over into line with the opening 7 in the heading die 8 and then the bar and cutter are withdrawn to their former positions.

A yoke-shaped bracket 9, which is practically rigid and has the necessary strength to sustain the strains of the work required and yet has sufficient elasticity to withstand the incident fatigue of the metal under continued rapid action, is fastened to the cutter-bar outside of the frame by means of the nut 10 that turns on the upper threaded end of the headed stud 11 which extends upwardly through the cutter-bar, the cap plate 12 and the base of the bracket. Pivoted to the top of the bracket by a pin 13 is the outer end of an arm 14. This arm extends inward across a part of the frame and between guiding ears 15 fastened on the frame. A leaf spring 16 has one end fastened to the top of the bracket by a screw bolt 17 and has its other end bearing upon the boss 18 on the top of the arm for holding the arm down with a yielding pressure. Articulated by the pin 19 between a fork at the free end of the arm is a hand 20. A lower extension 21 of this hand is forked and passing loosely through this fork and the arm is a pin 22. A spring 23 thrusting between the top of the arm and nuts 24 on the pin tends to draw the forked end of the hand upwardly and turn the other end of the hand downwardly. Extending vertically through the hand is a slot 25 and passing through this slot is the upper end of a finger 26. This finger is adjustably secured in the slot in the hand by means of the set screws 27 and 28. The lower end of the finger extends downward to a point just beyond the horizontal plane which passes through the centers of the openings through the heading die, cutting die and in the edge of the cutting blade. An adjustable stop 29 is arranged in the frame to determine the position of the lower end of the finger as it is swung over by the pull of the spring 23, and prevent it from obstructing the opening through the cutting die when the parts are in feeding position, and yet will allow it to bear against the stock that is fed so as to hold the cut piece in the cutting opening 4 of the blade.

After the stock has been fed through the cutting die to the required distance the cutter bar moves inward and shears off a piece of the stock of the correct length to form the article. As the cutter moves inward to shear the stock the spring 23 swings the hand so as to keep the finger pressed against the stock and thus hold the stock in the opening in the cutter blade as it is moved forward for transferring the sheared piece into line with the heading die. The cutter and finger retain the stock in this alinement until the punch pushes a portion of the stock into the heading die and then the cutter is withdrawn so as to get out of the way of the punch. When the cutter is withdrawn the finger drags over the stock then held by the punch and die, the hand turning and the arm lifting as the cutter bar is drawn back to permit this. After the end of the finger has cleared the stock the springs 23 and 16 cause the hand to swing the finger back and the arm to swing down while the stop holds the finger so that it will not obstruct the following feed of the stock.

With this construction the bracket which is yoke-shaped has sufficient rigidity to perform its function and sufficient elasticity so that the metal will not become fatigued and break off under the strain of the rapid continuous action of the machine. This bracket made in this way is easily fastened to the cutter bar by a single stud and nut and readily adjusted so that the arm will aline with the fixed guiding ears through which it passes. The arm is held down and yet is allowed to rise when required by the flat spring which is simple to make, easy to apply and is durable and efficient. The hand at the end of the arm is free to oscillate as required and yet is held in a substantial manner and the finger which is carried by the hand is readily adjustable for different sizes of stock which it is required to hold to the cutter during transfer.

The invention claimed is:

1. The combination with the reciprocatory cutter-bar and cutter of a heading machine, of a bracket secured to and movable back and forth with the cutter-bar, an arm with one end pivoted to the bracket and extending across a portion of the frame, a leaf spring with one end secured to the bracket and the other end bearing down upon the arm, a hand articulated to the free end of the arm, a spring controlling the turning movements of the hand, and a finger projecting downwardly from the articulated hand and terminating adjacent to the cutting edge of the cutter.

2. The combination with the reciprocatory cutter-bar and cutter of a heading machine, of a bracket secured to and movable back and forth with the cutter-bar, an arm with one end pivoted to the bracket and extending across a portion of the frame, ears fastened to the frame for guiding the arm, a leaf spring with one end secured to the bracket and the other end bearing down upon the arm, a hand articulated to the free end of the arm, a spiral spring controlling the turning movements of the hand, and a finger projecting downwardly from the articulated hand and terminating adjacent to the cutting edge of the cutter.

3. The combination with the reciprocatory cutter-bar and cutter of a heading machine, of a yoke-shaped bracket secured to and movable back and forth with the cutter-bar, an arm with one end pivoted to the bracket, a leaf spring fastened to the bracket and bearing down upon the arm, a spring-controlled hand articulated to the free end of the arm, and a finger projecting downward from the hand and terminating adjacent to the cutting edge of the cutter.

4. The combination with the reciprocatory cutter-bar and cutter of a heading machine, of a yoke-shaped bracket, a stud and nut attaching the base of the bracket to the cutter-bar, an arm with one end pivoted to the top of said yoke, a leaf spring with one end secured to the top of the yoke and the other end bearing down upon the top of the arm, a hand articulated to the free end of the arm, a finger adjustably mounted on the hand and having its end extending downward and terminating adjacent to the cutting edge of the cutting blade, and a spring arranged to turn the hand and swing the lower end of the finger toward the cutter.

5. The combination with the reciprocatory cutter-bar, cutter, cutting die and heading die of a heading machine, of a yoke-shaped bracket, a stud and nut attaching the base of the bracket to the cutter bar, an arm with one end pivoted to the top of said yoke, a leaf spring with one end secured to the top of the yoke and the other end bearing down upon the top of the arm, a hand articulated to the free end of the arm, a finger adjustably mounted on the hand and having its end extending downward and terminating adjacent to the cutting edge of the cutting blades, a spring arranged to turn the hand and swing the lower end of the finger toward the cutter, and an adjustable stop arranged to engage the finger and determine the position of the lower end thereof with relation to the opening through the cutting die.

CHARLES T. BRENNAN.